United States Patent [19]

Oliver et al.

[11] Patent Number: 5,303,372
[45] Date of Patent: Apr. 12, 1994

[54] PIPELINED IMAGE DATA COMPRESSION SYSTEM

[75] Inventors: David C. Oliver, Maple Hts.; Micheal J. Petrillo, Euclid; John F. Vesel, Willowick, all of Ohio

[73] Assignee: Picker International, Inc., Highland Hts., Ohio

[21] Appl. No.: 719,969

[22] Filed: Jun. 24, 1991

[51] Int. Cl.$^5$ .............................................. G06K 9/36
[52] U.S. Cl. ...................................... 382/56; 358/430
[58] Field of Search ......................... 341/51, 60, 67; 358/429, 430, 135, 136, 261.2; 382/56, 54; 370/7, 82, 83, 99, 109, 118; 375/122

[56] References Cited

U.S. PATENT DOCUMENTS

| | | | |
|---|---|---|---|
| 3,715,722 | 2/1973 | Hall | 358/135 |
| 4,335,372 | 6/1982 | Aufderheide et al. | 341/51 |
| 4,369,464 | 1/1983 | Temime | 358/136 |
| 4,734,768 | 3/1988 | Pexa | 370/83 |
| 5,079,548 | 1/1992 | Fujiyama et al. | 341/60 |

OTHER PUBLICATIONS

Digital Picture Processing, Azriel Rosenfeld and Avinash C. Kak Second Edition, vol. 1, Academic Press, Inc. 1982 pp. 165–176.

Primary Examiner—David K. Moore
Attorney, Agent, or Firm—Fay, Sharpe, Beall, Fagan, Minnich & McKee

[57] ABSTRACT

Pixel values f(m,n) of an image are reduced (A) by predicting each pixel value based on preceding pixel values and retaining the deviation e(m,n) between the actual and predicted values. The reduced values e(m,n) are serially fed to an input latch (20). A latched sizer (22) determines the larger of the number of bits of the value in the input latch and the largest previously received reduced value e(m,n). A comparator (42) compares a number of bits from the latched sizer with the number of bits per field indicated by a look-up table (44). Each time another reduced value e(m,n) is received, a state counter (46) indexes one state, i.e., increases the number of bit fields per output word and, when necessary causes the look-up table (44) to reduce the number of bits per field. When the comparator (42) determines that the number of bits from the latched sizer will not fit in the bit field size indicated by look-up table (44), a bit shuffler (C) is caused to form a packed word from the precedingly received reduced values. When the number of bits does fit into the bit field, the reduced value in the input latch (20) is forwarded to the bit shuffler and the process repeated with the next reduced value.

8 Claims, 5 Drawing Sheets

PIPELINED IMAGE DATA COMPRESSION SYSTEM

BACKGROUND OF THE INVENTION

The present invention relates to the art of data compression. It finds particular application in conjunction with a hardware implementation of high speed data compression for medical diagnostic images that will be described with particular reference thereto. It is to be appreciated, however, that the invention will also find application in conjunction with the compression of other types of image and non-image data either in hardware or software implementation.

Heretofore, various techniques have been developed for reducing the volume of data for more efficient storage and for faster transfer rates in bandwidth limited systems. Run length coding is one of the most commonly used data compression techniques. However, its coding and pattern matching algorithms have a very restricted application, such as half tone images and text compression. Although ideally suited for facsimile transmissions, run length coding is not a particularly suited to medical diagnostic images which have a wide range of gray scale.

Pattern matching is another common data compression technique. In pattern matching, the data is examined for frequently repeating words or data groups. This technique is particularly applicable to text data where a limited number of words tend to repeat frequently. However, the technique is of limited application in image data where the data tends not to have such a high repetition rate.

The data compression techniques that are better suited to image data commonly require two passes. In the first pass, the magnitude of the data is reduced by eliminating redundancy. The magnitude reduction can be achieved by various techniques such as linear predictive coding (LPC), discreet cosine transforms (DCT), and dictionary building. The first pass is relatively straightforward and generally amenable to synchronous pipeline operation.

The second pass, which packs the data, is less amenable to fast processing. Common packing techniques include Huffman coding, arithmetic coding, and field packing. In Huffman coding, the unique bit pattern of variable length is allocated to each input value, with common values having smaller patterns. In the arithmetic coding, each value is represented by an interval in an arbitrary precision binary fraction. In field packing, several values of a packing factor field are packed into each word. Although Hoffman coding is typically performed synchronous to the output bit stream, it is limited by the bit rate. Arithmetic coding is performed in software and is not generally considered amenable to hardware implementations. Field packing is typically implemented by pre-scanning incoming data to determine which packing factor to use before performing the actual packing. The pre-scan can be done in parallel, but at a considerable expense in hardware resources and complexity.

Many of these packing schemes used in the second pass are unable to process signed data directly. In the LPC and DCT techniques, the data is first remapped adding a binary integer such that positive values are all even numbers and negative values odd numbers. This adds an additional level of processing to the data packing pass.

The present invention contemplates a new and improved data compression technique which overcomes the above-referenced drawbacks and others.

SUMMARY OF THE INVENTION

In accordance with one aspect of the present invention, image data is compressed in a synchronous pipeline. In a first portion of the synchronous pipeline, the magnitude of the data is reduced, such as with a linear predictive coding algorithm. The output of the first portion of the synchronous pipeline is connected with a second portion which implements a packing algorithm. The second portion is again pipelined and runs synchronously with the first portion.

In accordance with a more limited aspect of the present invention, the packing portion uses a technique in which a preselected number of bits at the beginning of each word or field are reserved to identify a class of packing patterns or packing state. The subsequent bits (1) convey data in some states and (2) convey additional packing state information and data in other states. This enables a large number of packing states or formats to be identified while only reserving a very limited number of bits per word or field.

In accordance with another aspect of the present invention, each packing state holds data values of a single length. The states are indexed by a descending length for each value. As each new data value is brought in, its length is compared with an indication of the length of the longest data value designated for packing in the current word. The larger size of the two is compared with an indication of the amount of space remaining in the current word. If the presently received data value will fit in the space remaining, then that data value is sent to a bit shuffler and the state counter indexes. The indexing of the state counter, of course, in many instances will alter the number of bits remaining for the next comparison. This process continues until a presently received data value will not fit in the remaining bits. At this time, the bit shuffler shifts the previously received data values in order into a latch means, truncating redundant data most significant bits, as necessary, such that each of each data value has the same number of bits, i.e., is the same size. The state count of the state counter means is converted into a designation of the current packing state and input as the most significant bits of the word.

One advantage of the present invention is that it compresses large images with no loss of significant data.

Another advantage of the present invention is that the data compression is performed at a low hardware cost, with a clock synchronous to the input data.

Another advantage of the present invention is that it provides high speed performance with small hardware resources and costs.

Still further advantages of the present invention will be apparent to those with ordinary skill in the art upon reading and understanding the following detailed description.

BRIEF DESCRIPTION OF THE DRAWINGS

The invention may take form in various components and arrangements of components or in various steps and arrangements of steps. The drawings are only for purposes of illustrating the preferred embodiments and are not to be construed as limiting of the invention.

FIG. 2 is a diagrammatic illustration of a packing state table for use with the compression circuit of FIG. 1;

FIG. 5 is a diagrammatic illustration of an alternate embodiment to the state table of FIG. 2 that is particularly adapted to situations in which there is a large number of sequential, identical values.

DETAILED DESCRIPTION OF THE PREFERRED EMBODIMENT

Figure 1:
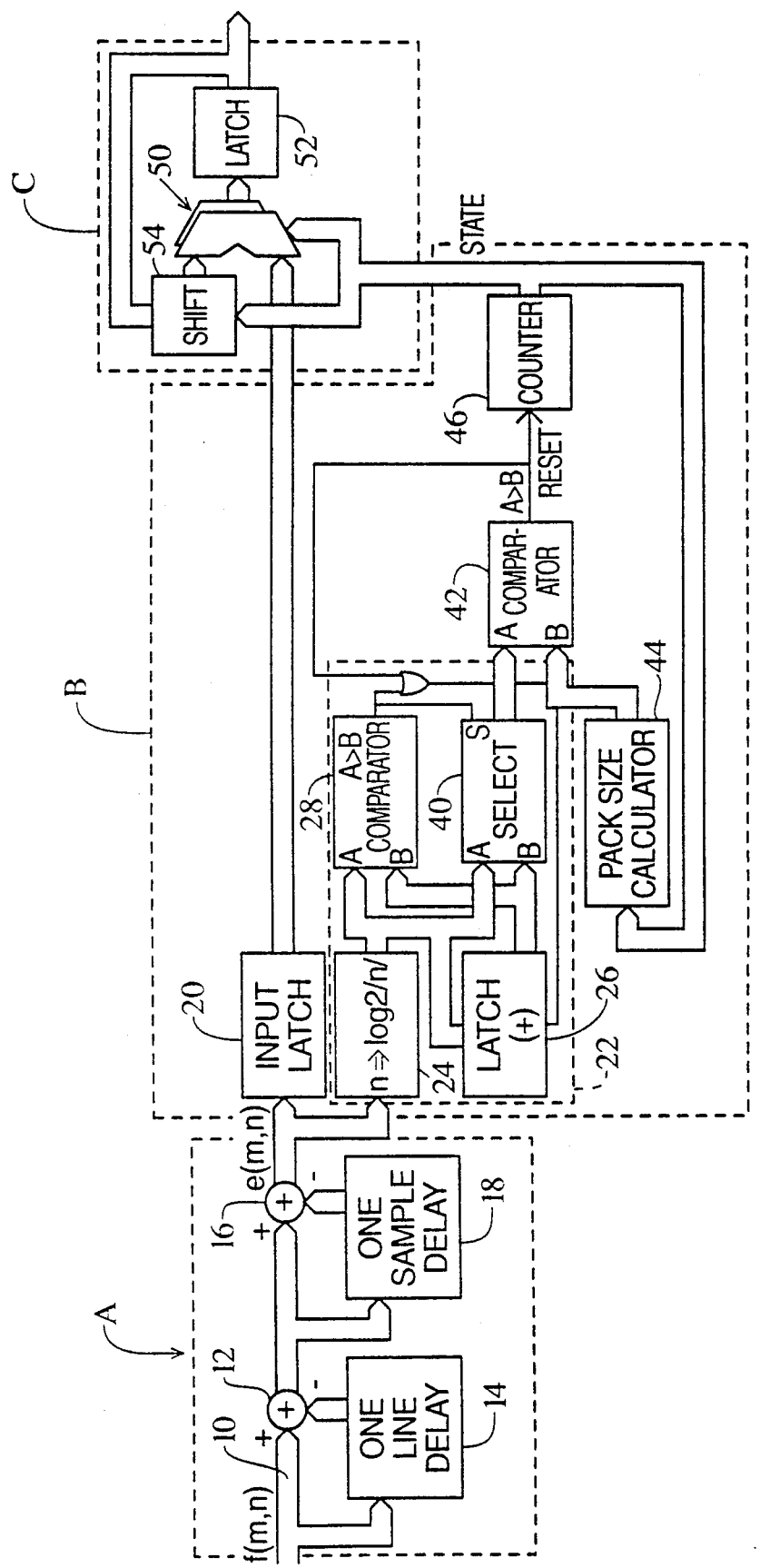
FIG. 1 is a diagrammatic illustration of a data compression circuit in accordance with the present invention.

With reference to FIG. 1, an image is defined as $M \times N$ two dimensional matrix of pixel values $f(m,n)$, where $m = 1,2, \ldots M$ and $n = 1,2, \ldots N$ A magnitude reduction means A sequentially receives each pixel value $f(m,n)$ and reduces it to shorter outputs values $e(m,n)$. The data is reduced by predicting a pixel value $f^*(m,n)$. The output $e(m,n)$ is than based on the difference or error between the actual pixel value $f(m,n)$ and the predicted pixel value $f^*(m,n)$, e.g.:

$$e(m,n) = f(m,n) - f^*(m,n) \qquad (1)$$

Thus, if the prediction scheme is relatively accurate, then the output of the magnitude the output $e(m,n)$ of the reduction means A is relatively small. In the preferred embodiment in which pixel value $f(m,n)$ has sixteen bits, $e(m,n)$ has between one and sixteen bits.

A packing means B serially receives each of the reduced values $e(m,n)$ and determines how many of the reduced values can be packed into an output word, e.g. a 32 bit word. More specifically to the preferred embodiment, each reduced value in any given one of the output words has the same number of bits, for simplicity of encoding and unpacking. The packing means inserts the reduced values $e(m,n)$ into equal sized bit fields within a single output word. The bit fields are as small as possible, yet long enough to hold the longest reduced value of the word with no loss of significance. That is, the bit field is large enough to accommodate the longest reduced value $e(m,n)$ of the series of reduced data values that can be packed into the output word. Shorter reduced values are expanded with zero to fill the selected bit field size.

A bit shuffler c assembles the equal sized fields that contain the one or more reduced values $e(m,n)$ and places them in order in the appropriate number of least significant bits of the next output word. In the remaining most significant bits of the output word, the bit shuffler stores a packing state identification, i.e., a designation of the number and size of the bit fields.

In the preferred embodiment, the data reduction means A preforms a linear predictive coding algorithm in a pipeline fashion. Linear predictive coding predicts that a given pixel value $f^*$ will differ from the corresponding pixel value of the preceding row $f(m,n-1)$ by the same amount as the preceding pixel $f(m-1,n)$ differed from the preceding pixel of the preceding row $f(m-1,n-1)$, i.e., $$f^*(m,n) = f(m,n-1) + [f(m-1,n)(m-1,n-1)] \qquad (2)$$

It will be appreciated that for the first pixel value of the first row $e(1,1)$ is itself, i.e., $e(1,1)$ $f(1,1)$. This provides a reference on which the following prediction error values $e(m,n)$ can be based.

As each pixel value is received at an input 10 it is conveyed to both a summing junction 12 and a one line delay means 14 such as a N bit shift register. The summing junction 12 adds the received pixel value $f(mn)$ with the negative of the corresponding pixel value of the preceding row $f(m-1,n)$. The difference $f(m,n) - f(m-1,n)$ is conveyed concurrently to a second summing junction 16 and a one bit or sample delay means 18. The one sample delay means 18, such as a shift register, delays its input 1 clock cycle such that its output is $f(m-1,n-1) - f(m-1,n-1)$. The second summing junction 16 subtractively combines the output of the one bit delay means 18 with the output of the first summing junction to generate the reduced bit data value $e(m,n)$ for storage, i.e., $$e(m,n) = f(m,n) - f^*(m,n) \qquad (3).$$

$$e(m,n) = f(m,n) - f(m-1,n) - f(m,n-1) + f(m-1,n-1) \qquad (4).$$

Figure 2:
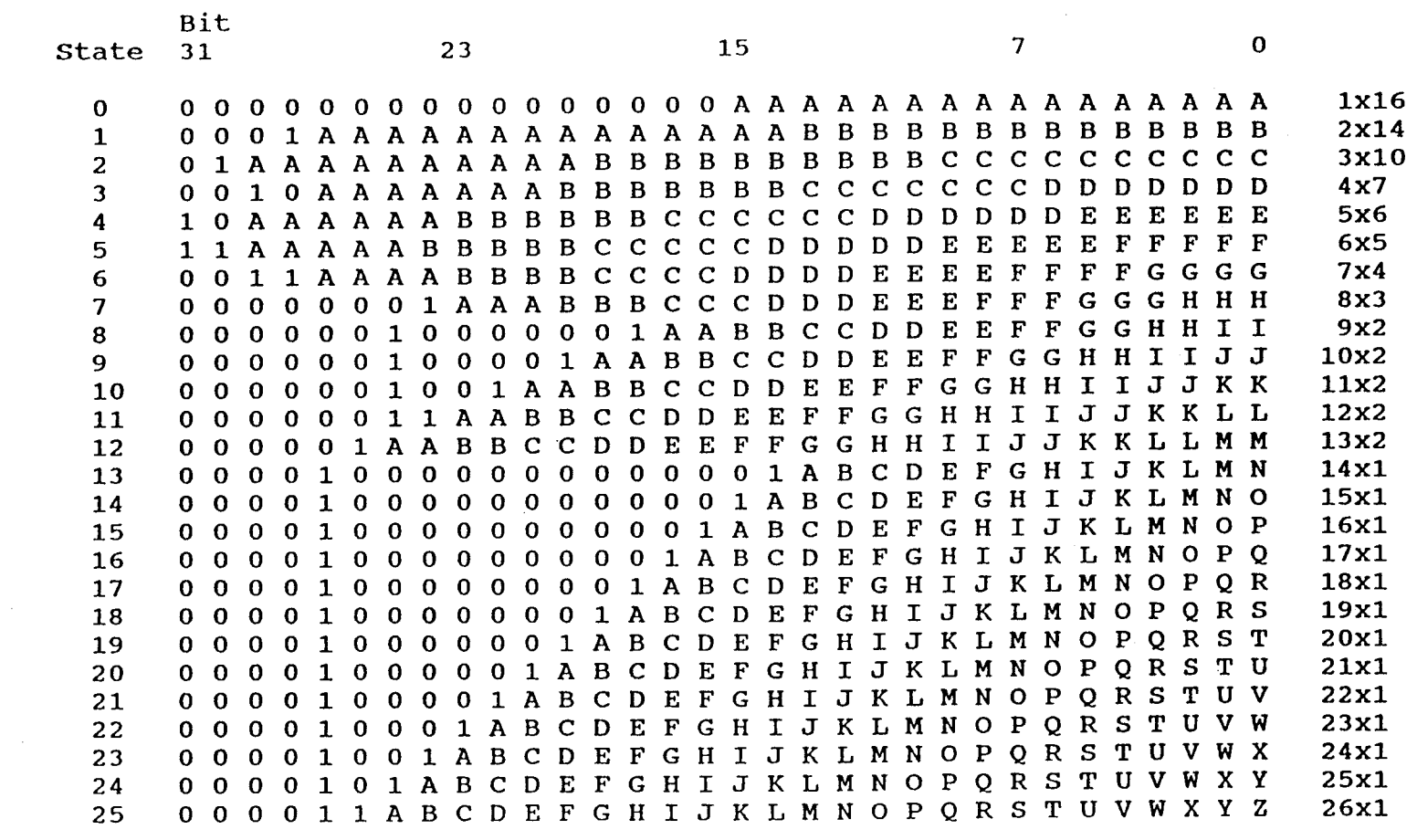

With reference to FIG. 2, in the 32 bit output words embodiment, twenty-five packing states are identified or indexed. The first two most significant bits of the 32 bit word bits 31 and 30 are reserved for the state identification These two bits designate four classes or groups of states. Three of these four two bit state identifications are used to identify three of the states, the second, fourth, and fifth states of FIG. 2. In these three states, the data $e(m,n)$ uses all of the available remaining 30 bits. The third or 0,0 group of states, identify states which have at least a third and possibly as many as 18 bits that can be used to identify the state before the data commences. Various patterns of placing the zeroes and ones in the available more significant bits may be utilized to identify the states, such as the pattern shown in FIG. 2. The states are numbered or indexed in descending order by the size of the allocated bit fields. For bit fields of the same size, the states are numbered in ascending order by the number of bit fields utilized.

With reference, again to FIG. 1, the packing means B includes an input latch 20 which temporarily latches each received reduced value $e(m,n)$. A latched sizing means 22 determines the size of a minimum bit field for the value $e(m,n)$ that is currently stored in the input latch 20. The minimum number of bits available in the bit field is the larger of the number of bits of the present value $e(m,n)$ and the number of bits of the largest of the preceding reduced values $e(m,n-1)$, $e(m,n-2)$, . . . which have not as yet been formed into an output word by the bit shuffler C. More specifically, a bit field size measuring means 24 measures the bit field size of the received value. A latch 26 stores the bit field size of the largest previously received reduced value not yet formed into an output word. On each clock cycle, a comparing means 28 compares the measured bit field length from the bit field length measuring means 24 with the bit field in latch 26. If the length from latch 26 is longer, it provides the number of bits output from the bit field sizing means 22. However, if the newly received value $e(m,n)$ is larger, then its steps a selecting means 40 to a larger number on each clock cycle until the selecting means 40 indicates the bit field size required by the newly received reduced data value. The newly indexed bit field size is loaded in the latch means 26 to form the basis of the next comparison. Because the same field size is loaded in the latch 26 as is designated by the bit field size measuring means 24, the selecting means 40 outputs a bit field size required by the currently received reduced value e(m,n).

A second comparing means 42 compares the number of bits per field required to accept the reduced value e(m,n) in the input latch 20 with a number of bits available in the word in the current state. That is, the comparing means 42 compares the field size designated by the bit field size determining means 22 with the number of bits allocated from the next state indicated by a size calculating means 44. In the preferred embodiment, the packing size calculating means 44 is a look up table which is addressed by a state counter 46. On each clock cycle, the state counter indexes by one state, i.e. one bit field per word, until the comparing means 42 determines that there is no room available in the output word being formed for the large of the received reduced value in the input latch 20 and the larged reduced value previous accepted for the word being assembled. Before the state counter 46 is reset, the designated state is output to the bit shuffler c to designate the format in which the previously received reduced values are to be organized. The reset signal also resets the bit field sizing means 22, particularly latch 26 such that it holds a single bit field of the maximum size, e.g. 16 bits.

In the bit shuffler c, the reduced values e(m,n) are received in one of a plurality of multiplexers 50. The first received value is stored in the least significant bits of an output latch 52. A shift means 54 controls the multiplexers in accordance with the output of the state counter 46 before it was reset. That is, the shift means truncates redundant most significant bits from any of the bit fields, as may be necessary, such that the reduced value bit fields are stacked end to end. Also in response to the state counter being reset, a state identification is received from the state counter 46 by the multiplexing means 50 and stored in the most significant bits of the output latch 52. The word including the state identification and one or more reduced date values e(m,n), e(m,n−1), . . . is output on the next clock cycle as the output word. The output words are stored more compactly in mass storage, transmitted with less bandwidth on a communications channels, and the like.

Figure 3:
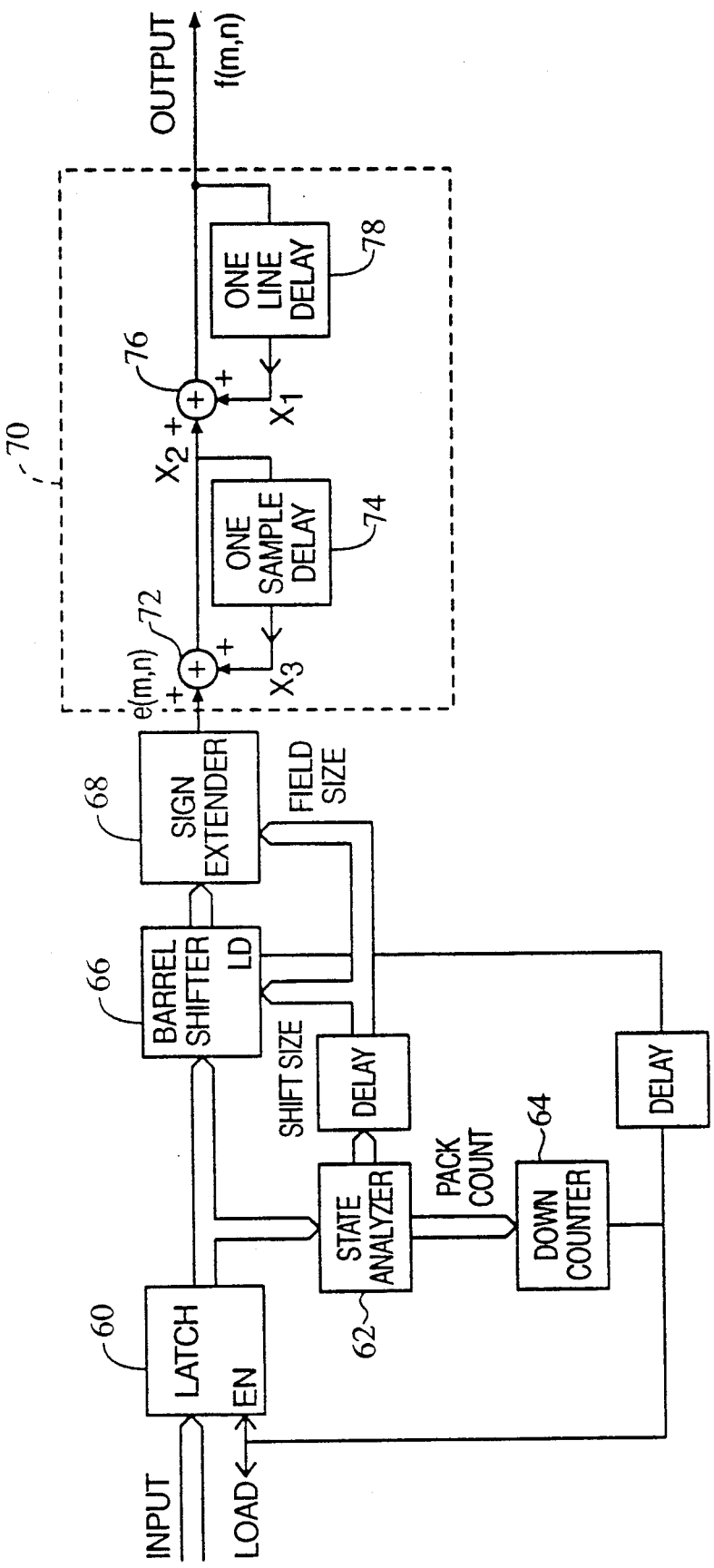
FIG. 3 is a circuit diagram of a data decompression circuit for decompressing the data compressed by the circuit of FIG. 1.

With reference to FIG. 3, when the data is to be decompressed, the data words are received in a latch means 60. A state analyzing means 62 analyzes the most significant bits of each word to translate the state identification. The analyzing means 62 may be a look up table, for example, which converts the most significant bit pattern into an indication of the state identification and the length and the number of bit fields packed into the word. A counter means 64 is initialized by the number of fields packed into the data of each word. At the start of each input cycle, the latch input from latch 60 is loaded into a barrel shifter 66. The barrel shifter outputs each field of the packed data in turn. A sign extender 68 restores the truncated upper bits including the sign bit of each e(m,n) data value. That is, it restores each e(m,n) to 16 bits adding zeroes as necessary.

A decoder means 70 transforms the reduced data values e(m,n) back into the original data f(m,n). In the preferred linear predictive coding technique, the extender means 70 includes an adding means 72 which adds the reduced value e(m,n) to a preceding reduced value e(m−1,n) from a one sample delay means 74. A second adder means 76 adds the output of the first adder means 72 with an output of a one line delay means 78. In this manner, the reduced value e(m,n) is restored to its original 16 or other bit size value f(m,n).

Figure 4:
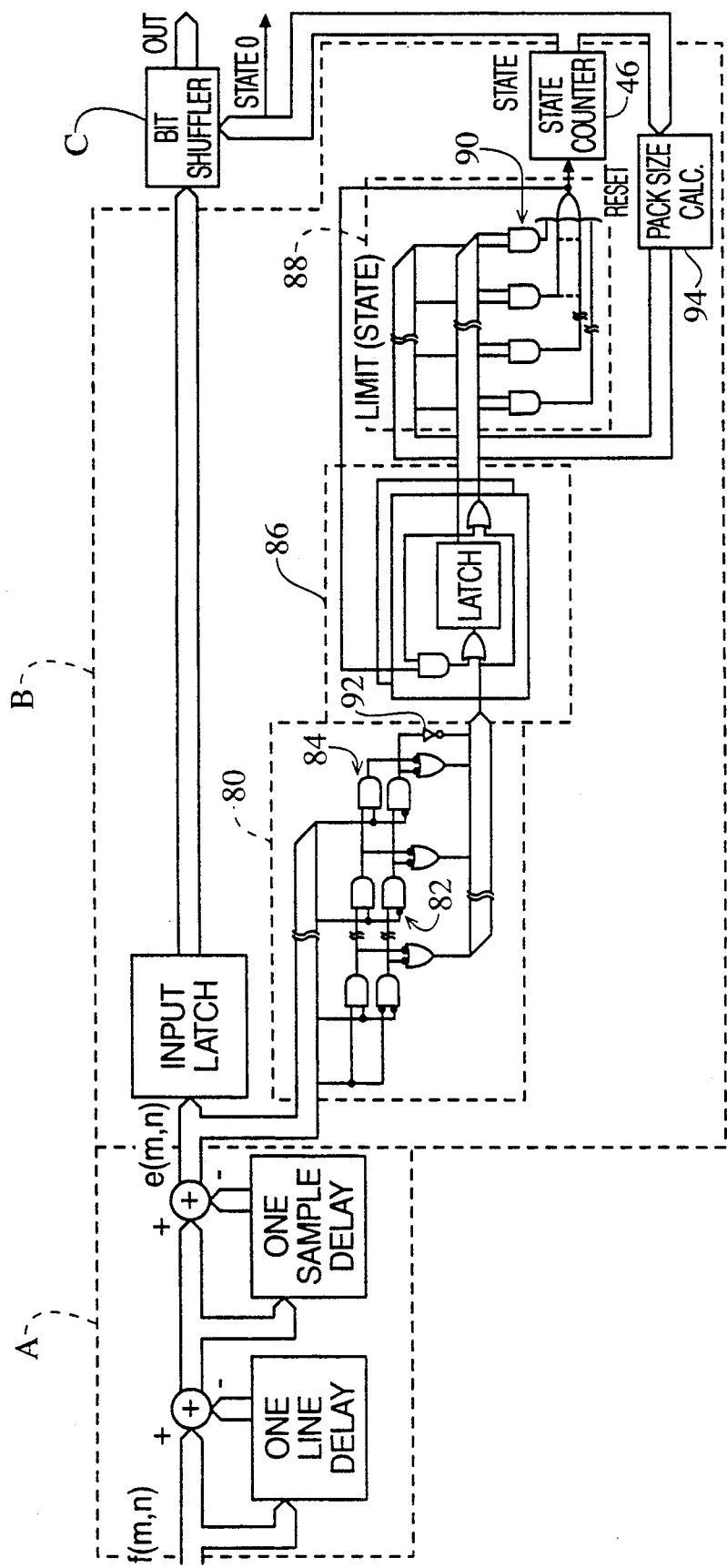
FIG. 4 is a diagrammatic illustration of an alternate embodiment of the circuit of FIG. 1 which utilizes bit vectors.

With reference to FIG. 4, the packing means B can be simplified with a size vector generator means 80 generating a size vector containing a unary representation of the size of each reduced value, e(m,n). This avoids explicitly determining the true size of each reduced value. Each of the N bits of a data vector are connected with a row of AND gates 52. When negative numbers are used, a second row of AND gates 84 is provided. In this manner, the lower AND gate row 82 produces an indication of the length of positive numbers and the upper row 84 provides and generates a size vector for negative reduced values. A size checker means 86 handles each bit of the size vector separately. The size vector is output from the size checker means 86 is validated against the state by a state validating means 88. More specifically, the output vector of the size checker means 86 is ANDed by AND gate row 90 with the next higher state or field size to determine the space remaining in the word being packed. When there is insufficient space, a reset signal is generated to reset the size checker and the state counter 46. Because the size vector generator 80 and the size checker 86 have independent logic for each bit, many different vector bit sizes can be used.

In another alternate embodiment, the state counter 46 is a Moebious/Johnson counter. This s advantageous over a conventional binary counter in that any state can be decoded using two input AND gates. The AND gates apply the two most contiguous sets of states. When using such a counter, the number of AND gates in the size vector validation means 88 can be reduced to three.

Figure 5:
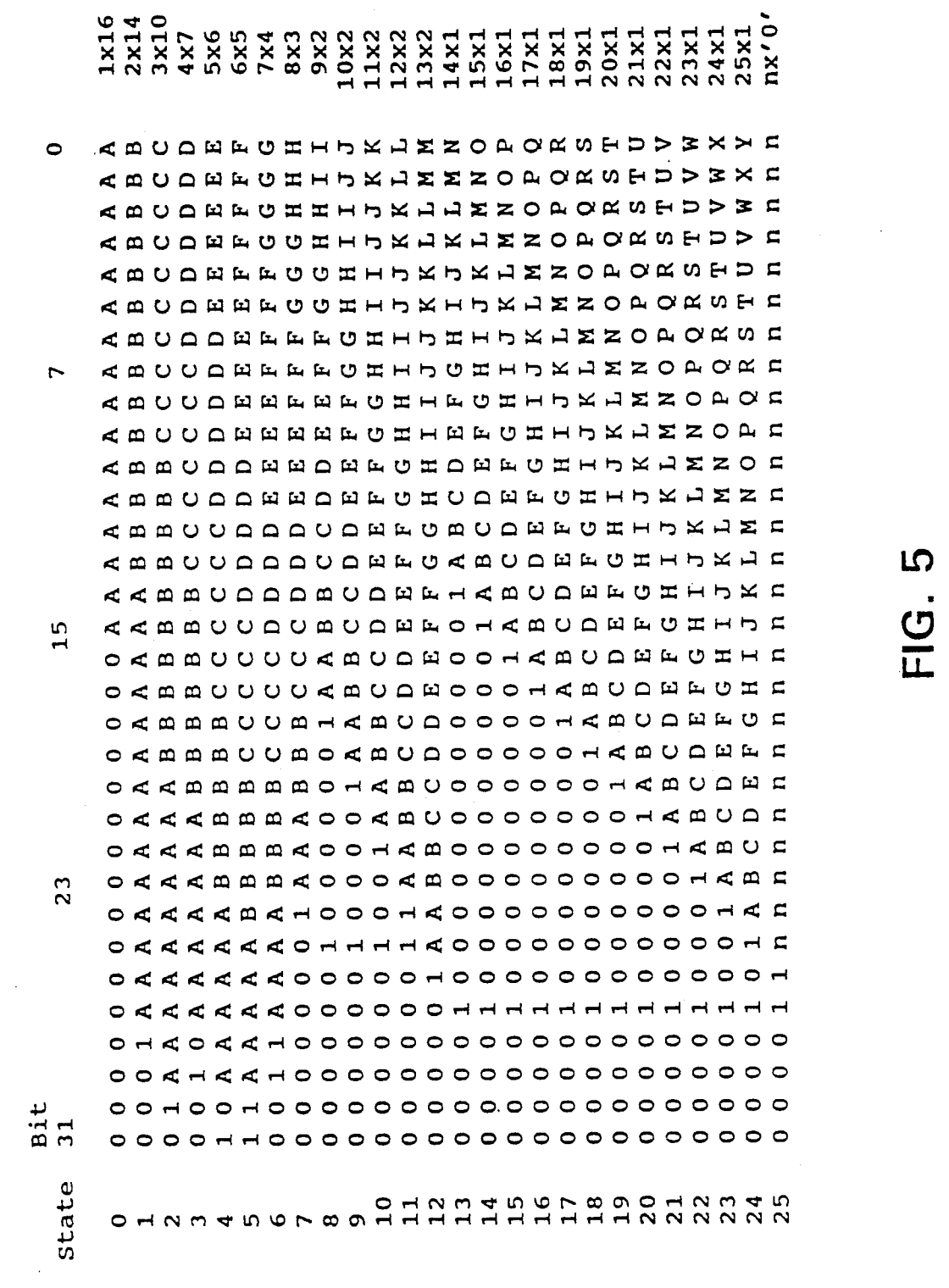

With reference to FIGS. 4 and 5, in yet another alternate embodiment, in some images there is a relatively large proportion of identical values. For example, a zero or black gray scale is often present around the border of an image. To reduce or compress the data further, a run length coding scheme can be added as one of the states of the state table. To this end, a non zero gate 92 is added to the size vector generator so. A packing size calculator means 94 is combined with the state counter 46 to count the number of consecutive zeroes or other preselected value. More specifically, in the state map of FIG. 5, the least significant bits indicate the number n of zeroes packed.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. An apparatus for packing image data, the apparatus comprising:

a magnitude reduction means for sequentially receiving each pixel value of an image and pipeline processing each pixel value to generate a reduced value having the same or fewer bits than the corresponding received pixel value;

a packing means for serially receiving each reduced value and pipeline processing to determine how many of the serially received reduced values can be packed into an output word of a pre-selected length and providing an indication of a number and bit length of the reduced values to be packed in each output word;

a multiplexing means which has first and second inputs, the first input receiving each reduced value from the packing means;

a shifting means for controlling the multiplexing means for truncating and aligning each bit field of the multiplexing means, as necessary, such that each reduced value fills an allocated bit field; and an output latch which receives the truncated reduced values from the multiplexing means and an indication of the size and number of the bit fields, the output latch being connected with the multiplexing means second input for selectively supplying the truncated values and the indications of the size and the number of bit fields thereto.

2. An image data processing apparatus comprising:

a magnitude reduction means for sequentially receiving each pixel value of an image and pipeline processing each pixel value to generate a reduced value having the same or fewer bits than the corresponding received pixel value;

a size vector generator means for generating a size vector that contains a representation of the size of each reduced value;

a size checker means which handles each bit of the size vector separately for checking the vector size;

a state indicator means for providing the indication of the number and bit length of the reduced values to be packed into the output word;

a validating means for comparing the size signal from the size checker means with the bit length from the state indicator means to determine space remaining in the word being packed;

a bit shuffler means for assembling the reduced values and the size vectors into output words.

3. The apparatus as set forth in claim 2 wherein the size vector generating means includes a row of AND gates, each AND gate having inputs connected to receive adjacent bits of the reduced value.

4. The apparatus as set forth in claim 1 wherein the magnitude reduction means includes:

a means for predicting each pixel value based on preceding pixel values; and a means for determining the reduced value by determining a deviation between the received pixel value and the predicted pixel value.

5. An apparatus for packing image data, the apparatus comprising:

a magnitude reduction means for sequentially receiving each pixel value of an image and pipeline processing each pixel value to generate a reduced value being the same or fewer bits than the corresponding received pixel value;

an input latch means for serially receiving each reduced value;

a sizing means for determining a bit length of each reduced value;

an available space means for determining a number of uncommitted bits remaining in the output word;

a comparing means for comparing the bit length from the sizing means with the number of uncommitted bits;

a bit shuffler means for assembling the reduced values and an indication of the bit length of each reduced value into output words, the bit shuffler performing one of (1) forming an output word from previously received pixel values and (2) receiving the pixel value in the input latch for incorporation into the output word in accordance with the comparison of the bit length and the number of uncommitted bits.

6. The apparatus as set forth in claim 5 wherein each reduced pixel value of the output word is assigned a bit field of the same size and further including:

a state counter means which indicates a number of bits per bit field and a number of bit fields per word, the state counter being indexed by the comparing means and providing an output to the bit shuffler means to provide an indication of a number of the bits in each bit field and the number of fields in the output word.

7. The apparatus as set forth in claim 6 wherein the sizing means further includes:

a means for storing an indication of the bit length of the reduced value with the longest of bit length previously forwarded to the bit shuffler means for incorporation into the output word;

a means for determining a larger of the bit length of the reduced value in the input latch and the bit length of the longest bit length previous reduced value in the output word and forwarding the larger of the bit lengths to the comparing means.

8. The apparatus as set forth in claim 7 wherein the available space means generates: an indication of the number of bits per field in the current state, the space available means being operatively connected with the state counter means such that it is indexed with each received reduced value to indicate the number of bits per field in the state which stores the next largest number of bit fields, such that the state counter means increases the number of fields per word and, when necessary, reduces the number of bits per field until the comparing means determines at least one of the reduced values in the input latch and a reduced value previously forwarded for incorporation into the output word will not fit in the next state.

* * * * *